United States Patent
Perkowski

(10) Patent No.: US 6,619,165 B2
(45) Date of Patent: Sep. 16, 2003

(54) TUNABLE TOOLHOLDER

(75) Inventor: Randy M. Perkowski, Cuyahoga Falls, OH (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/061,820

(22) Filed: Feb. 1, 2002

(65) Prior Publication Data

US 2003/0147707 A1 Aug. 7, 2003

(51) Int. Cl.⁷ ................................................ B23B 47/00
(52) U.S. Cl. .................... 82/160; 409/141; 82/160; 408/143
(58) Field of Search ................... 408/143, 1 R; 409/141; 82/159, 160, 161; 74/574; 188/379

(56) References Cited

U.S. PATENT DOCUMENTS

| | | | |
|---|---|---|---|
| 3,598,498 A | 8/1971 | Holmen | 408/143 |
| 3,643,546 A | 2/1972 | Richter et al. | 90/11 A |
| 3,774,730 A | 11/1973 | Maddux | 188/1 B |
| 3,838,936 A | 10/1974 | Andreassen et al. | 408/143 |
| 4,197,771 A * | 4/1980 | Heaton et al. | 82/160 |
| 4,553,884 A | 11/1985 | Fitzgerald et al. | 408/143 |
| 4,784,543 A * | 11/1988 | Mitchell et al. | 409/234 |
| 4,817,003 A | 3/1989 | Nagase et al. | 364/463 |
| 5,170,103 A * | 12/1992 | Rouch et al. | 409/141 |
| 5,228,813 A * | 7/1993 | Scheer et al. | 408/178 |
| 5,413,318 A | 5/1995 | Andreassen | 267/140 |
| 5,518,347 A | 5/1996 | Cobb, Jr. | 409/141 |
| 5,810,528 A | 9/1998 | O'Connor et al. | 409/141 |
| 6,033,161 A * | 3/2000 | Scheufler, Jr. | 408/201 |
| 6,415,696 B1 * | 7/2002 | Erickson et al. | 82/160 |
| 6,443,673 B1 * | 9/2002 | Etling et al. | 409/141 |

FOREIGN PATENT DOCUMENTS

GB    1179217    1/1970    ........... B13Q/11/00

* cited by examiner

*Primary Examiner*—A. L. Wellington
*Assistant Examiner*—Dana Ross
(74) *Attorney, Agent, or Firm*—Larry R. Meenan

(57) ABSTRACT

A tunable toolholder with a dynamic vibration absorber wherein an absorber mass is compressed between two resilient supports utilizing at least one longitudinally movable pressure plate to dynamically tune the toolholder. The pressure plate is displaced by an adjustment screw extending through the front face of a toolholder head removably mounted at one end of the toolholder.

16 Claims, 2 Drawing Sheets

TUNABLE TOOLHOLDER

BACKGROUND OF THE INVENTION

1. Field of the Invention

The invention relates to a tunable toolholder for suppressing vibrations caused in the machining processes and, more particularly, to a tunable toolholder which utilizes a dynamic vibration absorber to suppress vibrations.

2. Description of Related Art

During a metal cutting operation, any vibration between a cutting tool and a workpiece may lead to undesirable cutting performances, such as poor workpiece surface finish and out-of-tolerance finished workpieces. Furthermore, such vibration may cause the cutting tool, or the associated machine tool, to become damaged.

To reduce this vibration, the metal removal rate can be decreased. However, this approach interferes with production and only minimally reduces the amount of vibration.

The cutting tool is typically secured within a toolholder. Attempts to eliminate the vibration in the toolholder, such as a boring bar, may include using a boring bar fabricated from solid carbide. Solid carbide, because of its inherently high density, reduces the amount of chatter and vibration transferred to the boring bar. However, solid carbide is extremely expensive. Furthermore, although chatter and vibration are reduced by the inherently high density of the solid carbide bar, vibration nonetheless may build up to an unacceptable level. Still furthermore, solid carbide is fairly brittle and a minor impact upon the boring bar during use or setup may inadvertently damage the bar.

Other attempts to reduce vibration in boring bars include mounting upon or within the bar a dynamic vibration absorber, such as that absorber disclosed in U.S. Pat. No. 3,774,730, which is comprised of a cylindrical mass of a high density material supported on rubber bushings. When optimally tuned, the mass oscillates in response to the vibration produced in the boring bar to cancel out vibration. The absorber may be tuned to accommodate the boring bar for the speed at which the workpiece or boring bar is rotating, the length of the boring bar, and the type of cutting tool connected at the end of the bar. Such an adjustment is made by longitudinally urging pressure plates at opposing ends of the cylindrical mass, thereby compressing the rubber bushings against the mass. This simultaneously shifts the position of the mass and alters the stiffness of the rubber bushings to change the dynamics of the bar.

Typically, the adjustment of the pressure plates is made from the rear of a boring bar as illustrated in U.S. Pat. No. 3,838,936 or from the side of the toolholder, as illustrated in FIG. 1 of U.S. Pat. No. 5,518,347.

While these mechanisms may be suitable for toolholders and boring bars having relatively large diameters, when a toolholder has a small diameter, such as, for example, less than one inch, then because of space limitations, access from the rear of the toolholder, or from the side of the toolholder, may become difficult and passageways providing such access may substantially weaken the boring bar structure.

U.S. Pat. No. 5,518,347 (the '347 patent) is also directed to a tuned damping system for an end mill, wherein a tuning fixture has a longitudinally oriented adjusting screw to apply force against elastomeric supports, which act against a damper mass. However, after adjusting the supports against the mass, the tuning fixture must be removed and replaced with a cutting head to perform various cutting tasks. The damper mass is kept in compression after removal of the tuning fixture by a clamping screw, which locks the system adjustment in place. While the cutting head is in place, the tuning of the system is fixed and may not be adjusted further.

The system disclosed in the '347 patent permits front adjustment of the supports, but does so in a fashion that creates yet another disadvantage. The tuning fixture is placed on the end mill during a tuning operation and, once the system is tuned utilizing the tuning fixture, the clamp screw must be secured and the tuning fixture removed and replaced with an appropriate cutting head. The tuning fixture is sized such that the mass is very near to the mass of the cutting head to simulate the presence of the cutting head during a machining operation. As a result, if a different cutting head were to be used, then a different tuning fixture having a different mass would be required.

SUMMARY OF THE INVENTION

A toolholder used for metalworking operations has a shank having a front end, back end and a longitudinal axis, wherein a cavity extends within the shank along the axis and wherein the cavity defines a cavity wall. An absorber mass is positioned within the cavity, wherein the mass has a first end and a second end. A resilient support circumscribes each end of the mass and is positioned to suspend the mass within the cavity. There is a pressure plate at each end of the absorber mass adjacent to each resilient support, wherein at least one pressure plate is movable along the longitudinal axis to compress each resilient support against the absorber mass. A toolholder head has a pocket adapted to receive a cutting tool and furthermore has a front face and a rear face, wherein the head is secured at the rear face to the front end of the shank. An adjustment screw extends through the front face of the toolholder head and is oriented to displace the movable pressure plate along the longitudinal axis within a desired range against the resilient support at the first end of the shank.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
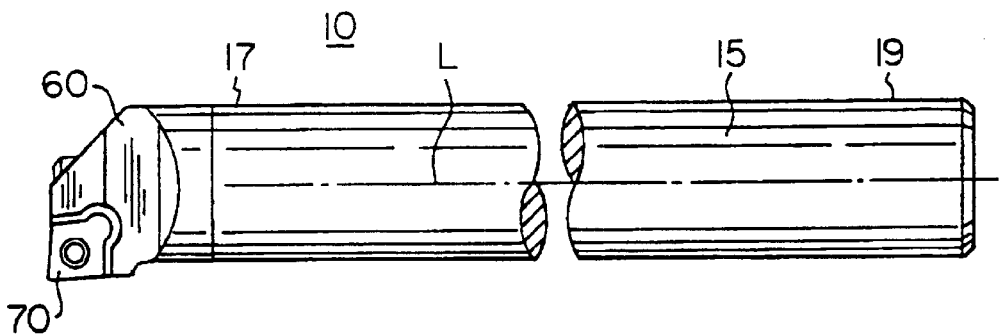
FIG. 1 illustrates a top view of a toolholder, which, in this instance, is a boring bar, in accordance with the subject invention.
Figure 2:
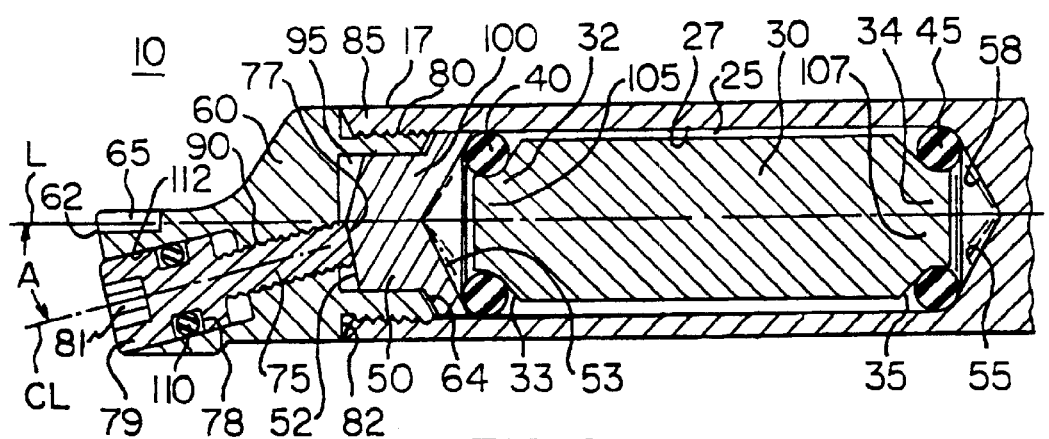
FIG. 2 is a cross sectional view of the toolholder illustrated in FIG. 1.
Figure 3:
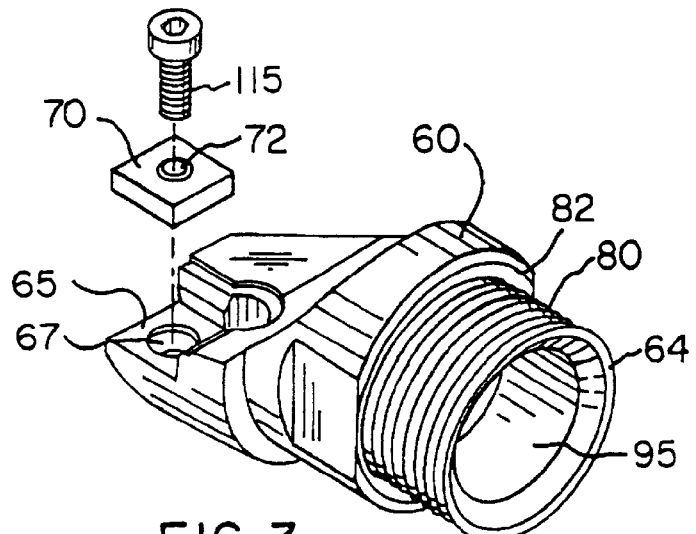
FIG. 3 is a perspective view of a toolholder head in accordance with the subject invention.

Directing attention to FIGS. 1–3, a toolholder 10 used for metal operations is comprised of a shank 15 having a front end 17 and a back end 19. A longitudinal axis L extends along the length of the toolholder 10. A cavity 25 extends within the shank 15 along the longitudinal axis L. The cavity 25 defines a cavity wall 27.

An absorber mass 30 is positioned within the cavity 25. The absorber mass 30 has a first end 32 and a second end 34. A first resilient support 40 circumscribes the first end 32 of the absorber mass 30 and is positioned against the cavity wall 27 to suspend the absorber mass 30 within the cavity 25. A second resilient support 45 circumscribes the second end 34 of the absorber mass 30, and is positioned against the cavity wall to suspend the mass 30 within the cavity 25. A first pressure plate 50 is positioned at the first end 32 of the absorber mass 30 adjacent the first resilient support 40. A second pressure plate 55 is positioned at the second end 34 of the absorber mass 30 adjacent to the second resilient support 45. At least one pressure plate, in this instance pressure plate 50, is movable along the longitudinal axis L to compress each resilient support 40, 45 against the absorber mass 30.

A toolholder head 60 has a pocket 65 adapted to receive a cutting tool 70. The toolholder head 60 additionally has a front face 62 and a rear face 64. The toolholder head 60 is secured at the rear face 64 to the front end 17 of the shank 15.

Directing attention to FIG. 2, an adjustment screw 75 extends through the toolholder head 60 and is oriented to displace the pressure plate 50 along the longitudinal axis L within a desired range against the first resilient support 40 at the front end 17 of the shank 15. In turn, the absorber mass 30 will be urged against the second resilient support 45, which is then urged against the second pressure plate 55 to provide compression of both the first resilient support 40 and the second resilient support 45 against the absorber mass 30.

The adjustment screw 75 extending through the toolholder head 60 to engage the first pressure plate 50 provides a simple adjustment mechanism, while, at the same time, the integrity of the shank 15 is maintained since no material is removed from the shank 15 to provide a bore therein for an adjustment screw. By incorporating the adjustment screw 75 in the toolholder head 60, material is taken from the toolholder head 60 to provide the bore for the adjustment screw 75. Additionally, by incorporating this feature into the toolholder head 60, the fabrication and assembly of the remaining portions of the toolholder 10 are simplified.

The toolholder head 60 is removably secured to the shank 15. In particular, toward the rear face 64 of the toolholder head 60 is a threaded portion 80 that is secured within a threaded portion 85 of the cavity wall 27. Additionally, the toolholder head 60 may further include a shoulder 82 circumferentially extending from the threaded portion 80 to abut with the front end 17 of the shank 15.

The adjustment screw 75 may be threadably engaged within a mating adjustment screw bore 90 having a bore centerline CL within the head 60, wherein the centerline CL forms an angle A of between approximately 10 to 80° with the longitudinal axis L.

As illustrated in FIG. 2, the adjustment screw 75 may enter the front face 62 of the toolholder head 60 at a location below the pocket 65. It is also possible for the adjustment screw 75 to enter the front face 62 of the toolholder head 60 above the pocket 65. While such a design is not illustrated in FIG. 2, it should be obvious from the details so far disclosed and visualization of such an embodiment is apparent therefrom. Furthermore, it is also possible for the adjustment screw 75 to enter the toolholder head 60 at an angle from the side of the toolholder head 60 and not directly through the front face 62.

As illustrated in FIG. 2, the adjustment screw 75 may have a flat end 77 which contacts a front surface 52. The adjustment screw 75 may be angled to provide a flush contact between the flat end 77 of the adjustment screw 75 and the front face 52 of the first pressure plate 50.

The toolholder head 60 may have a bore open toward the back end 19, while the first pressure plate 50, which is adjacent to the toolholder head 60, may have a projecting portion 100 which is matingly received and slidable within a bore 95. The longitudinal clearances between the projecting portion 100 and the bore 95 in the toolholder head 60 should be sufficient for the desired range of motion of the first pressure plate 50 within the cavity 25 of the shank 15.

The absorber mass 30 may have at the first end 32 and the second end 34 conical surfaces 33, 35, such that each resilient support 40, 45 circumscribes the first end 32 and the second end 34 of the absorber mass 30. Additionally, each pressure plate 50, 55 may have an inwardly facing conical surface 53, 58, which surrounds the first resilient support 40 and the second resilient support 45.

Each end 32, 34 of the absorber mass 30 may furthermore have a cylindrical protrusion 105, 107 extending past the conical surfaces 33, 35 to position and to provide additional support to the first resilient support 40 and the second resilient support 45.

To positively position the adjustment screw 75 within the adjustment screw bore 90, the adjustment screw 75 has at least one O-ring 110 about a groove 78 in a head 79 of the adjustment screw 75. The head 79 may be rotated using any number of conventional designs such as a hexagonal cavity 81 extending within the head 79 into which a mating wrench may be inserted. The O-ring 110 is sized such that it contacts a wall 112 of the adjustment screw bore 90 which accommodates the head 79 of the adjustment screw 75.

The resilient supports 40, 45 may be made of a number of resilient materials including rubber or an elastomer material. The material may be made of a Durometer A Scale 50 material.

Directing attention to FIG. 3, the pocket 65 may have a threaded bore 67 extending therein to accommodate a matingly threaded screw 115 intended to fit through a central bore 72 of the cutting tool 70 mounted within the pocket 65.

Figure 4:
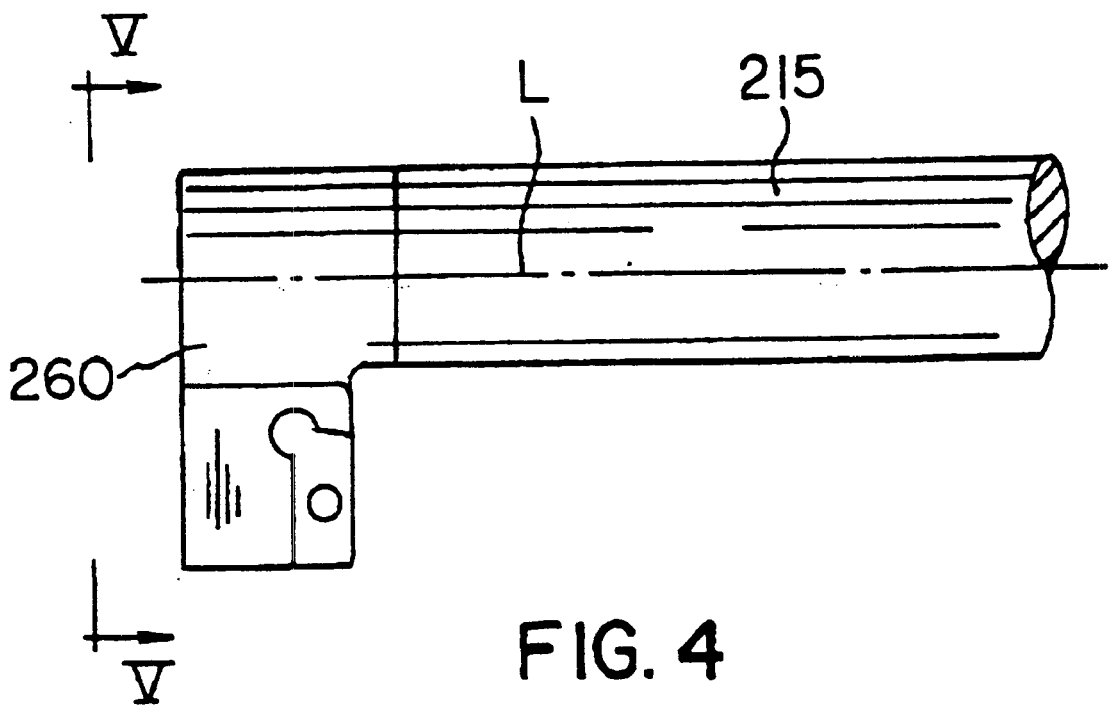
FIG. 4 is a top plan view of a boring bar wherein the head is offset relative to the shank.
Figure 5:
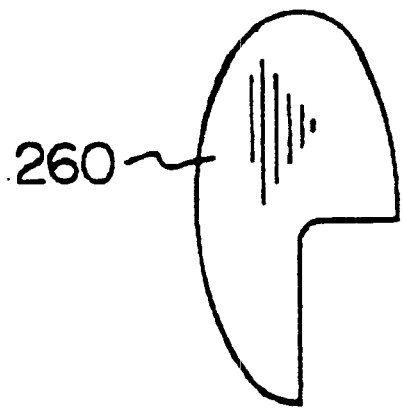
FIG. 5 is a side view from arrows "V—V" in FIG. 4.

While the shank 15 illustrated in FIG. 1 is cylindrical and the toolholder head 60 generally lies along the centerline L, as illustrated in FIGS. 4 and 5, it is entirely possible for the shank 215 to be non-cylindrical, and for the toolholder head 260 to be offset relative to the shank 215. With such an arrangement, the absorber mass (not shown) would preferably remain mounted within a cavity which extends within the shank 215. The remaining features of this embodiment are similar to those features already discussed in association with FIGS. 1–3.

Although this invention has been described with respect to certain embodiments, various modifications, revisions and additions will become evident to persons of ordinary skill in the art. All such modifications, revisions and additions are intended to be encompassed in the scope of this invention, which is limited only by the claims appended hereto.

I claim:

1. A toolholder used for metalworking operations, said toolholder comprising:

a) a shank having a front end, a back end and a longitudinal axis, wherein a cavity extends within the shank along the axis and wherein the cavity defines a cavity wall, b) an absorber mass positioned within the cavity, wherein the mass has a first end and a second end, c) a resilient support circumscribing each end of the mass and positioned to suspend the mass within the cavity, d) a pressure plate at each end of the absorber mass adjacent to each resilient support, wherein at least one pressure plate is movable along the longitudinal axis to compress each resilient support against the absorber mass, e) a toolholder head having a pocket adapted to receive a cutting tool and furthermore having a front face and a rear face, wherein the head is secured at the rear face to the front end of the shank, wherein the toolholder head is removably secured to the shank, and f) an adjustment screw extending through an adjustment screw bore in the front face of the toolholder head and oriented to displace the movable pressure plate along the longitudinal axis within a desired range against the resilient support at the front end of the shank, wherein the adjustment screw is threadably engaged within a mating adjustment screw bore having a centerline within the head wherein the centerline forms an angle of between 10° to 800 degrees with the longitudinal axis.

2. The toolholder according to claim 1, wherein the toolholder head has a threaded portion that is secured within a threaded portion of the cavity wall.

3. The toolholder according to claim 2, wherein the toolholder head further includes a shoulder circumferentially extending from the threaded portion to abut with the front end of the shank.

4. The toolholder according to claim 1, wherein the adjustment screw enters the front face of the head below the pocket.

5. The toolholder according to claim 1, wherein the adjustment screw enters the front face of the head above the pocket.

6. The toolholder according to claim 1, wherein the adjustment screw has a flat end which contacts an angled surface of the pressure plate.

7. The toolholder according to claim 1, wherein the toolholder head has a bore open toward the back end of the shank and wherein the adjacent pressure plate has a projecting portion which is matingly received and slidable within the bore.

8. The toolholder according to claim 7, wherein the projecting portion and the bore in the head have a mating length sufficient to accommodate the desired range of the pressure plate within the bore.

9. The tunable toolholder according to claim 1, wherein the absorber mass has at each end a conical surface and wherein a resilient support circumscribes each end of the absorber mass.

10. The tunable toolholder according to claim 9, wherein each pressure plate has an inwardly facing conical surface which surrounds each resilient support.

11. The tunable toolholder according to claim 9, wherein each end of the absorber mass furthermore has a cylindrical protrusion extending past the conical surface to position and to provide additional support to the resilient supports.

12. The toolholder according to claim 1, wherein the adjustment screw has at least one O-ring thereabout and wherein the O-ring is in contact with the adjustment screw bore to frictionally secure the adjustment screw within the bore.

13. The toolholder according to claim 1, wherein the resilient support is made of an elastomer.

14. The toolholder according to claim 1, wherein the resilient support is made of rubber.

15. The toolholder according to claim 1, wherein the pocket has a threaded bore extending therein to accommodate a matingly threaded screw intended to fit through a central bore of a cutting insert mounted within the pocket.

16. The tunable toolholder according to claim 1, wherein the toolholder is a boring bar.

* * * * *